Figure 3:
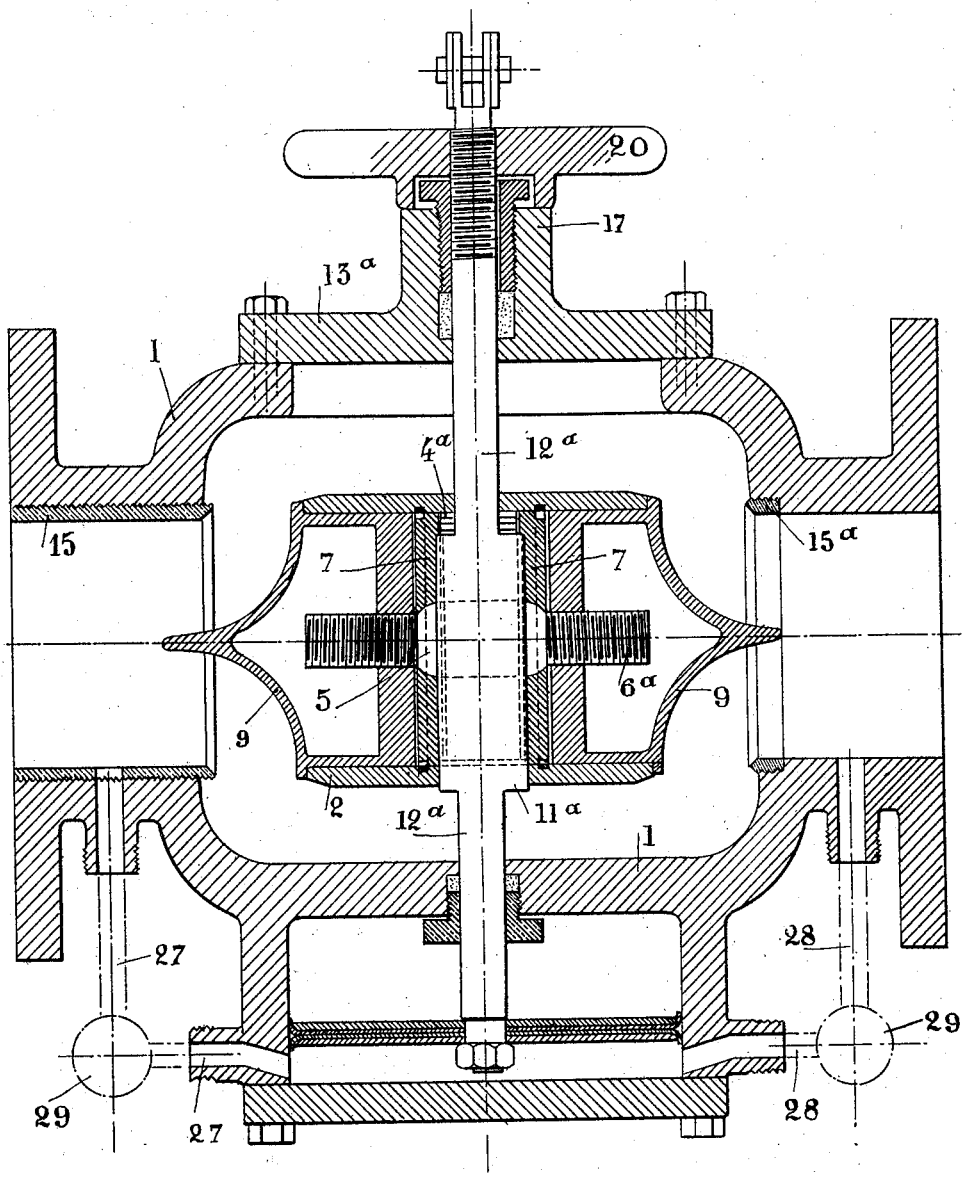

A. J. ASTIER.
VALVE FOR PIPES FOR WATER AND OTHER FLUIDS.
APPLICATION FILED MAR. 19, 1919.
1,387,446.
Patented Aug. 16, 1921.
3 SHEETS—SHEET 1.
Fig. 1
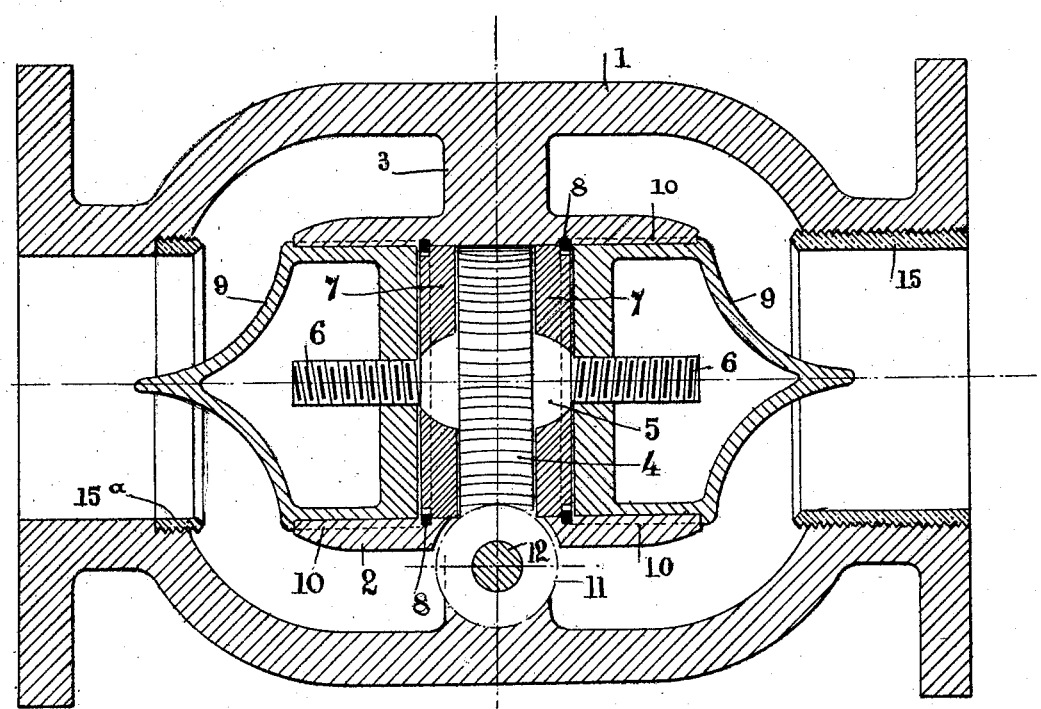
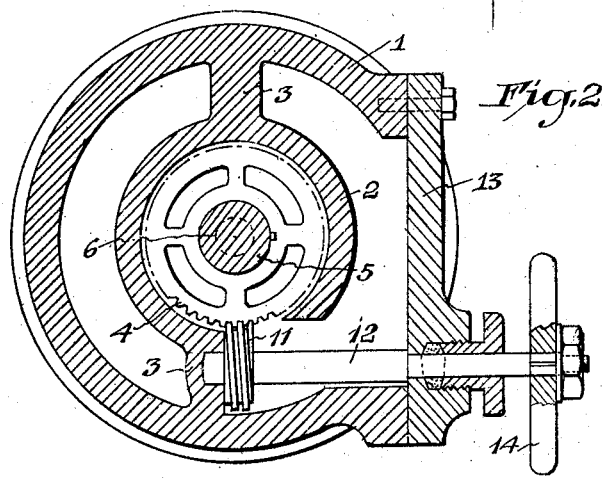
Fig. 2.
Inventor:-
Antoine Joseph Astier,
By:- B. Singer, Atty.

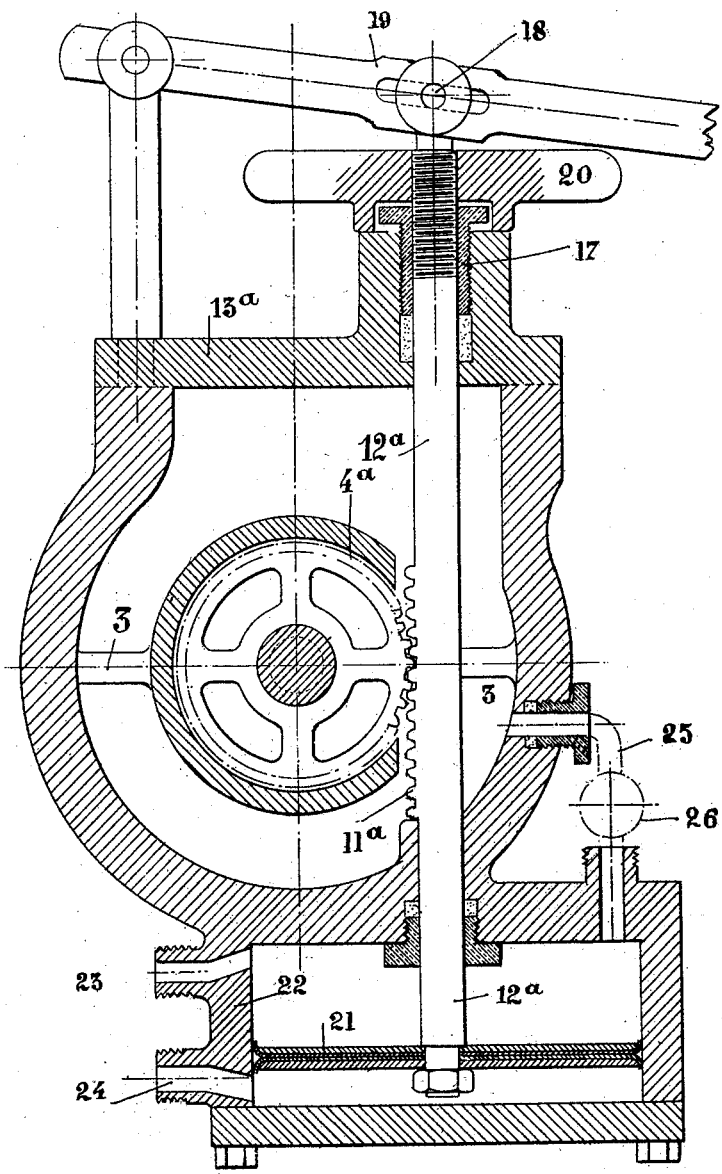

UNITED STATES PATENT OFFICE.

ANTOINE JOSEPH ASTIER, OF COLOMBES, FRANCE.

VALVE FOR PIPES FOR WATER AND OTHER FLUIDS.

1,387,446.

Specification of Letters Patent.

Patented Aug. 16, 1921.

Application filed March 19, 1919. Serial No. 283,636.

*To all whom it may concern:*

Be it known that I, ANTOINE JOSEPH ASTIER, residing at Colombes, France, have invented new and useful Valves for Pipes for Water and other Fluids, of which the following is a specification.

This invention relates to a valve more particularly intended for water supply piping of a fairly large diameter, but capable of being used for conveying any fluids in pipes of any desired dimensions.

This strong and simple valve is characterized by its symmetrical axial action in opening as well as in closing, which offers a great facility of manipulation and enables an absolutely tight joint to be obtained without any risk of any jamming.

In order to make the invention clearly understood, the present specification is accompanied, merely by way of example, by a drawing in which:

Figures 1 and 2 are respectively, in longitudinal section and in cross-section, views of the valve, Figs. 3 and 4 being similar views showing a modified arrangement.

In the said drawing, 1 is the body of the valve: it comprises inside an axial sleeve which is connected to it by a suitable number of arms or ribs 3.

In the interior of the sleeve 2 is mounted a worm wheel 4 keyed to a spindle 5, the parts of which, immediately adjoining that which receives the said wheel 4, have preferably the shape shown in Fig. 1, and the ends 6 of a smaller diameter being screw-threaded in opposite directions.

The central position of the wheel 4 in the axial sleeve 2 is insured by means of two disks 7 mounted on the spindle 5 at each side of the wheel and held in place by means of elastic rings 8 forced into the annular space left between their part of smaller diameter and the sleeve 2, and then expanding and penetrating into the annular grooves with which the said sleeve 2 is provided.

On each of the screw-threaded ends 6 of the spindle 5 is screwed a valve 9 inserted by means of grooves 10 into the sleeve 2 so as to slide in the latter without rotating.

The valves 9 are preferably of conical shape with a generatrix calculated so that the *vis viva* of the fluid should have little action on the same; they are intended to engage, one with the seat 15, and the other with the seat 15$^a$, both secured separately, merely for facility of construction.

The wheel 4 engages with a worm 11, for which one of the arms 3 forms a guide and a stop, and the spindle 12 of which passes, by means of a stuffing box or gland, through the disk 13 closing the window with which the body of the valve is provided for the purpose of facilitating inspection and fitting together of the parts.

The hand wheel 14 is intended to manipulate the worm 11.

It will be understood that, according as the latter is turned in one or in the other direction, the valves 9 will be moved away from, or brought nearer to, each other and consequently the valve opened or closed.

It goes without saying that a slight axial play must be provided in practice in fitting together the parts contained in the sleeve 2, in order to enable the two valves 9 to press each against their seats 15 or 15$^a$.

It must be pointed out that, when the valve is being closed, the *vis viva* of the fluid acting on the corresponding valve 9 is greatly reduced by the preferable shape given to the latter, and that the tight closing of the apparatus is doubly insured, since any escape of the fluid is successively opposed by the two valves 9.

In the construction shown in Figs. 2 and 3, the valve is arranged so as to be operated quickly by a single operation of a lever in one or in the other direction, according as the valve is to be closed or opened.

In this case, the worm 4 is replaced by a spur wheel 4$^a$ engaging with a tooth rack 11$^a$ and, of course, the screw-thread of the spindle 6$^a$ is suitably steeper than that of the rods or ends 6 of the spindle of Figs. 1 and 2.

13$^a$ is the disk for closing the window, and the rod 12$^a$ of the tooth rack passes through it by means of a gland 17.

The said rod 12$^a$, between the joint 18 of the operating lever 19 and the gland 17, is provided with a small hand wheel 20 screwed to it and intended to form when locked, a safety stop when the rod is in the upper position corresponding to the closing position of the valve, in order to avoid at any time accidental opening.

The construction shown in Figs. 3 and 4 is more particularly adapted for hydraulic control of the valve, the pressure of water being utilized for the purpose.

To that end, the rod 12ᵃ passes at the bottom, by means of a gland, through the wall 1 of the valve, and is connected to a piston 21 which can slide in a cylinder 22 of sufficient cross-section.

At each of its ends, the cylinder 22 is provided with a branch 23 or 24 intended to receive a drain cock; its top cover is connected by a conduit 25 to a stop cock 26; the body 1 of the valve and its lower part can be connected to one or the other of the branches of the body 1 of the valve by means of the conduits 27 and 28 provided respectively with stop cocks 29 and 30.

It is obvious that the conduits 25, 27 and 28 could be cast in one with the body of the apparatus.

It will be understood that, on the handwheel 20 being released, in order to open the valve, first the drain cock of the branch 23 will be closed, and that of the branch 24 opened, then the cock 25 is opened; owing to the axial play provided between the elements 9, 7 and 4ᵃ, as soon as the hand wheel 20 has been released, the pressure of the water will act in the central part of the valve and thence on the upper face of the piston 21 which, owing to its descent, will produce an opening of the valve.

For closing, the cock 26 as well as that of the branch 24 is closed, the cock of the drain branch 23 is opened, as well as one of the cocks 29 and 30, that at the side from which the pressure is coming; the said pressure acting on the lower face of the piston 21, will raise the latter and force the valves 9 against their seats 15 and 15ᵃ.

Having now particularly described and ascertained the nature of my said invention and in what manner the same is to be performed, I declare that what I claim is:

1. A valve comprising a body having alined outlets at opposite ends and also having a sleeve between and concentric with said outlets, valve seats at the inner ends of said outlets, valves mounted for sliding movement in said sleeve toward and from said seats, a shaft having oppositely threaded end portions engaging corresponding openings in the valves, an operating gear on said shaft and between the valves, cushioning members between the valves and said gear to permit slight independent movement of the valves, and means, coacting with said gear to turn said shaft and thereby operate the valves.

2. A valve comprising a body having alined outlets at opposite ends and also having a sleeve between and concentric with said outlets, valve seats at the inner ends of said outlets, valves mounted for sliding movement in said sleeve toward and from said seats, a shaft having oppositely threaded end portions engaging corresponding openings in the valves, an operating gear on said shaft and between the valves, disks in the sleeve and on opposite sides of the gear, and cushioning members between the disks and the valves, to hold the disks in place and permit limited independent movement of the valves.

In testimony whereof I affix my signature.

ANTOINE JOSEPH ASTIER.